United States Patent
Pathak et al.

(10) Patent No.: US 12,028,332 B2
(45) Date of Patent: *Jul. 2, 2024

(54) MANAGING DECRYPTION OF NETWORK FLOWS THROUGH A NETWORK APPLIANCE

(71) Applicant: Gigamon Inc., Santa Clara, CA (US)

(72) Inventors: Manish Pathak, San Jose, CA (US); Kishor Joshi, Milpitas, CA (US); Murali Bommana, Fremont, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,312

(22) Filed: Oct. 31, 2022

(65) Prior Publication Data

US 2023/0084792 A1  Mar. 16, 2023

Related U.S. Application Data

(63) Continuation of application No. 16/352,735, filed on Mar. 13, 2019, now Pat. No. 11,516,205.

(51) Int. Cl.
*H04L 9/40* (2022.01)
*H04L 43/0876* (2022.01)
*H04L 61/5007* (2022.01)
*H04L 67/568* (2022.01)

(52) U.S. Cl.
CPC ...... *H04L 63/0823* (2013.01); *H04L 43/0876* (2013.01); *H04L 61/5007* (2022.05); *H04L 67/568* (2022.05)

(58) Field of Classification Search
CPC ............. H04L 63/0823; H04L 43/0876; H04L 61/5007; H04L 67/568; H04L 41/0894; H04L 63/0281; H04L 63/0464; H04L 63/20
USPC ........................................................ 713/156
See application file for complete search history.

(56) References Cited

U.S. PATENT DOCUMENTS

| | | | |
|---|---|---|---|
| 7,992,209 B1 | 8/2011 | Menoher et al. | |
| 2010/0125897 A1 | 5/2010 | Hope et al. | |
| 2014/0108794 A1* | 4/2014 | Barton | H04L 63/0428 713/165 |
| 2016/0078230 A1* | 3/2016 | Silverstone | H04L 63/20 713/2 |

(Continued)

OTHER PUBLICATIONS

Notice of Allowance for U.S. Appl. No. 16/352,735 dated Aug. 24, 2022, 7 pages.

(Continued)

*Primary Examiner* — Tu T Nguyen
(74) *Attorney, Agent, or Firm* — Perkins Coie LLP

(57) ABSTRACT

A network appliance receives a communication from a client device that includes a request to establish a network connection to a server. Prior to initiating a network connection between the network appliance and the server, the network appliance accesses a server certificate issued by the server. In response to a determination, based on application of a policy to the server certificate, not to decrypt data transmitted between the client device and the server, the network appliance establishes only a single connection between the network appliance and the server. The network appliance transmits encrypted data between the client device and the server over the single connection.

20 Claims, 4 Drawing Sheets

(56) References Cited

U.S. PATENT DOCUMENTS

2018/0302443 A1    10/2018  Weiss et al.
2019/0166160 A1*   5/2019   Syvänne ............. H04L 63/0227
2019/0312846 A1    10/2019  Taylor et al.

OTHER PUBLICATIONS

Final Office Action dated Oct. 14, 2021 for U.S. Appl. No. 16/352,735, 13 pages., dated Oct. 14, 2021.
Non-Final Office Action dated Mar. 30, 2021 for U.S. Appl. No. 16/352,735, 11 pages., dated Mar. 30, 2021.
Non-Final Office Action For U.S. Appl. No. 16/352,735 dated Apr. 14, 2022; 13 pages., dated Apr. 14, 2022.

* cited by examiner

MANAGING DECRYPTION OF NETWORK FLOWS THROUGH A NETWORK APPLIANCE

CROSS-REFERENCE TO RELATED APPLICATION

This application is a continuation of U.S. patent application Ser. No. 16/352,735, filed Mar. 13, 2019, issued as U.S. Pat. No. 11,516,205, on Nov. 29, 2022, which is incorporated herein by reference in its entirety.

TECHNICAL FIELD

This disclosure relates generally to network communications, and in particular to managing decrypted network communications passed through a network appliance.

BACKGROUND

Traffic in a computer network can be analyzed to improve real-time decision-making for network operations, security techniques, or other considerations. Given the complexity and volume of traffic routed through many infrastructures, various types of network tools are often used to analyze the network traffic. These network tools often sit between other devices in the network, establishing a connection with each device that enables the network tool to pass data streams transparently from one device to another while analyzing the network traffic. Some of these network tools provide capability to selectively decrypt traffic based on application of a policy. However, the policy may not be applied until after the tool has established a connection, or has nearly completed the establishment of a connection, with both the client and the server. If the network tool determines not to decrypt data after establishing the server connection, the server connection is torn down and a new connection reopened. As a result, two connections are opened between the tool and the server for each no-decrypt decision. Tearing down and reopening a connection causes increased latency, decreased connection rate, and a slower response to the client, negatively impacting network performance from the perspective of the client.

DETAILED DESCRIPTION

A network appliance, positioned inline between a client and a server, intercepts network traffic transmitted between the client and server to perform analysis or filtering on the traffic. The data transmitted by the client and/or the server is encrypted, and the network appliance applies a policy to determine whether to decrypt the data before passing the decrypted data to its intended target. The policy can be applied to a security certificate issued by the server, such as a signed secure sockets layer (SSL) or transport layer security (TLS) certificate that is stored at the network appliance, prior to initiating a secure connection between the network appliance and the server. By applying the policy to a stored certificate before initiating the connection, the network appliance can determine whether data from the server will be decrypted and establish the secure connection based on this decision. The network appliance according to various embodiments described herein therefore reduces the likelihood that a no-decrypt decision will be made after the network appliance has established a first connection to the server, which accordingly reduces the likelihood that the network appliance will need to tear down and re-open a connection to the server.

Figure 1:
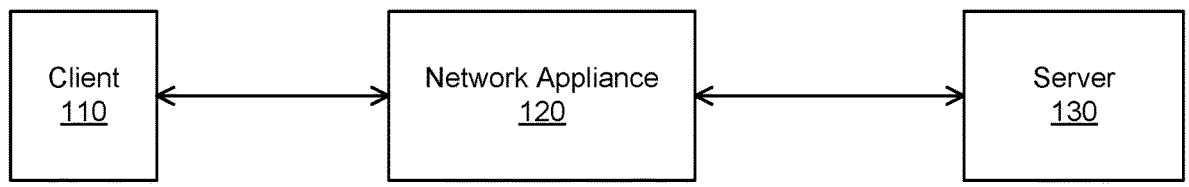
FIG. 1 illustrates an example environment in which a network appliance operates.

FIG. 1 illustrates an example environment 100 in which a network appliance operates. As shown in FIG. 1, the environment 100 can include a client device 110, a network appliance 120, and a server 130. Other embodiments of the environment 100 can include additional or different devices. For example, multiple clients 110 and/or multiple servers 130 can communicate in the environment 100 through the network appliance 120. The client device 110, network appliance 120, and server 130 may transmit data streams through various intermediate devices not shown in FIG. 1, such as routers, network switches, or proxy devices. Furthermore, data streams between the devices can be transmitted by wired or wireless connections over networks such as one or more local area networks (LANs), wide-area networks (WANs), metropolitan area networks (MANs), and/or the Internet.

The client device 110 communicates with the server 130, transmitting data packets to or receiving data packets from the server 130 in a networked communication session. In some embodiments, the client device 110 is a device used by a user to request content from the server 130, such as a laptop or desktop computer, mobile phone, or tablet. However, the client device 110 can additionally or alternatively be any of a variety of other computer devices such as another server or a node in the networked environment.

The server 130 similarly can transmit data packets to or receive data packets from the client device 110 in a networked communication session. In response to requests received from the client device 110, the server 130 can serve content to the client device 110. For example, the server 130 can be a web server configured to serve a requested webpage to the client 110. When a client requests a secure, encrypted connection to the server 130, the server issues a certificate that authenticates an identify of the server and can be signed by a trusted certificate signing authority. The authority that signed a certificate can be identified in the certificate by at least one of a distinguished name (DN), a common name (CN), or a value of an authority key identifier (AKID) extension of the certificate.

The network appliance 120 intercepts data packets transmitted between the client device 110 and server 130. The intercepted data packets can be inspected by the network appliance 120, or passed from the network appliance 120 to an external analysis tool, to analyze the data streams between the client 110 and server 130, monitor traffic within the computer network, and/or attempt to block or stop the transmission of abnormal or malicious data packets. In some cases, the network appliance 120 effectively isolates the client 110 from the server 130, removing or modifying data packets transmitted between the devices to perform tasks such as access control, web caching, or content filtering. The network appliance 120 can be configured as a node in a computer network that can receive data packets from one or more other nodes in the network, such as the client device 110 and server 130. The network appliance 120 can operate in an inline mode within a data path between a sending endpoint node (e.g., the client 110) and a receiving endpoint node (e.g., the server 130), receiving data packets from the sending endpoint node and forwarding at least some of the original data packets to the receiving endpoint node.

Data packets can be received and transmitted by the network appliance 120 at physical network ports of the appliance, and multiple network ports can be coupled to different nodes in the computer network. Embodiments of the network appliance 120 can be, for example, a monitoring platform that includes a chassis and interchangeable blades offering various functionalities, such as enhanced packet distributed and masking/filtering capabilities.

Messages between the client device 110 or server 140 and the network appliance 120, each including one or more data packets, can be encrypted. In some embodiments, the network appliance 120 can establish a secure network connection with the client device 110 and exchange data with the client device 110 that is encrypted using a first private key. The network appliance 120 can similarly establish a secure network connection with the server 140 and exchange data with the server 140 that is encrypted using a second private key. The secure connections between the network appliance 120, client 110, and server 130 can be enabled by a protocol such as transport layer security (TLS) or secure sockets layer (SSL). The network appliance 120 can determine whether to transmit encrypted data on each network connection in response to application of a policy. For example, the network appliance 120 may determine to decrypt data that is received over the secure connection with the server 130, before passing the decrypted data to the client 110.

Figure 2:
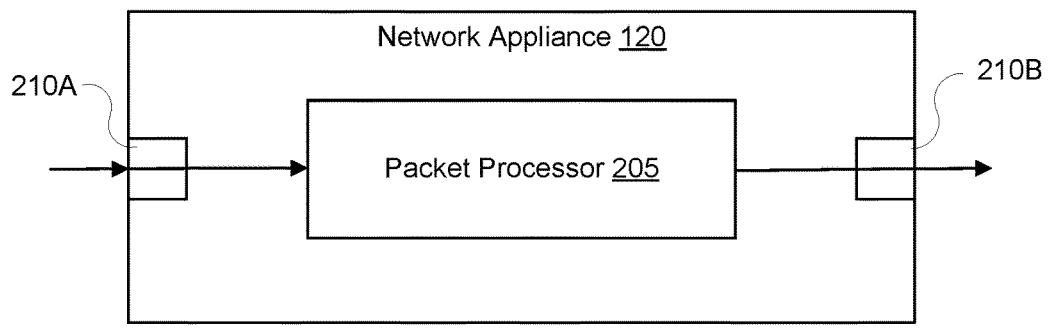
FIG. 2 is a block diagram that illustrates one embodiment of a network appliance.

FIG. 2 is a block diagram that illustrates one embodiment of the network appliance 120. As shown in FIG. 2, the network appliance 120 can include a packet processor 205, a first network port 210A, and a second network port 2108.

The network ports 210 are communicatively coupled to the client 110 and server 140 to receive data from or transmit data to the client 110 and server 130. For example, the network port 210A is communicatively coupled to the client 110, while the network port 210B is communicatively coupled to the server 130. In some embodiments, the network ports 210 can be physical ports in a housing containing the network appliance 120. In other embodiments, the network ports 210 represent virtual ports that may be combined as part of one or more physical ports. For example, the network port 210A and the network port 210B may be part of a single physical port in the housing of the network appliance 120. Similarly, the network ports 210 can be aggregates of multiple physical ports. For example, each port 210 shown in FIG. 2 can represent a group of physical ports used as a single packet transmission channel through link aggregation. In some embodiments, the network appliance 120 can also include a plurality of instrument ports, each of which can be coupled to an instrument configured to monitor network traffic passed through the appliance 120.

The packet processor 205 manages network connections between the network appliance 120, client 110, and server 130, and routes data packets between the network ports 210. The packet processor 205 can have a hardware processor such as a central processing unit or a microprocessor, and can include or be coupled to a memory that stores computer program instructions executable by the hardware processor. In some embodiments, the packet processor 205 applies a packet routing rule stored in the memory to determine how to handle a data packet received at the network appliance 120. The rule can cause the packet processor 205 to forward a data packet to a specified location, such as a specified network port 210. In some cases, the rule can also cause the packet processor 205 to process a data packet in a specified manner, such as aggregating the data packet with another data packet, removing the data packet from the network traffic, or modifying the packet (e.g., by adding a header to the packet, removing a header, or removing a payload).

The packet processor 205 can determine whether to decrypt data transmitted between the client 110 and server 130 based on application of one or more policies. If the packet processor 205 determines that a data stream should be decrypted, the packet processor 205 can decrypt any data transmitted between the client and server and intercepted by the network appliance 120. For example, the packet processor 205 decrypts data received from the server 130, enabling the packet processor 205 or an external tool to analyze the received data packets and/or to transmit the decrypted data to the client 110. If the processor 205 determines not to decrypt a data stream, the packet processor 205 can allow original, encrypted packets to pass through the network appliance without decryption.

Figure 3:
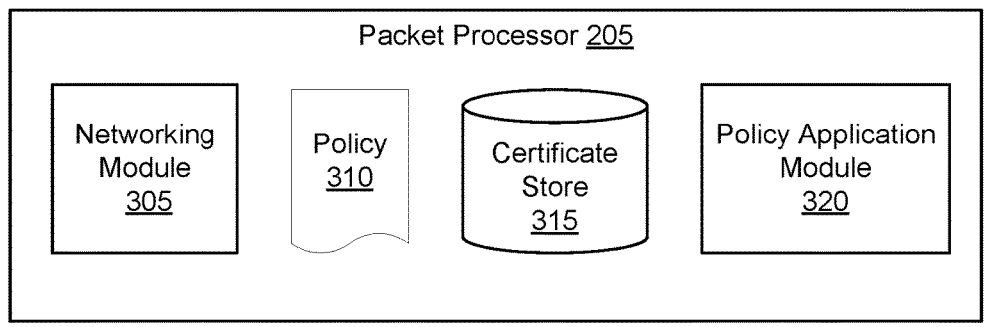
FIG. 3 is a block diagram illustrating functional modules executed by a packet processor.

FIG. 3 is a block diagram illustrating functional modules executed by the packet processor 205. As shown in FIG. 3, the packet processor 205 can execute a networking module 305 and a policy application module 320, as well as maintain or access a policy 310 and a certificate store 315.

The networking module 305 establishes network connections between the network appliance 120 and other devices and transmits data over the established connections. When a client 110 requests a connection to a server 130 (e.g., by initiating an SSL or TLS handshake with the server), the network module 305 can intercept the request and open a secure connection to the server 130 based on a determination of whether to decrypt data passed over the connection. If the data is to be decrypted, the networking module 305 can initiate an SSL or TLS handshake with the server 130 that allows the networking module 305 to receive encrypted data from the server. The networking module 305 can decrypt any data received from the server 130, analyze the data, and pass either the decrypted data or re-encrypted data to the client 110. If the data is not to be decrypted, the networking module 305 can pass the client request to the server 130 to complete the handshake between the client 110 and server 130.

As part of establishing a secure connection with the server 130, whether by passing the client request to the server or initiating a new handshake, the networking module 305 receives a certificate from the server 130. The networking module 305 can store the server certificate in the certificate store 315, enabling the certificate to be retrieved for subsequent client requests to connect to the server 130. The networking module 305 may perform periodic maintenance on the certificate store 305, removing old certificates and replacing the stored certificates if the server 130 issues a new certificate.

The certificate store 315 stores certificates issued by one or more servers 130. In some embodiments, the certificate store 315 can comprise a cache stored in memory local to the packet processor 205 or accessible by the packet processor 205. Alternatively, the certificate store 315 can be located in main memory or another storage location that is accessible to the packet processor 205. Each certificate stored in the certificate store 315 can be referenced by one or more keys, such as a server name indicator, a socket address, and/or a 3-tuple.

The policy application module 320 applies a policy 310 to determine whether to decrypt data transmitted between the client 110 and server 130. The policy 310, stored in a computer-readable medium within or coupled to the network appliance 120, includes data that specifies at least one condition and an instruction to decrypt or not to decrypt if the condition is satisfied. The condition may specify any of a variety of parameters of the server 130, client 110, or network connection(s) between the network appliance 120 and another device, such as identity of the server 130, identity of a certificate authority that signed the certificate issued by the server, a validation level of the certificate, or other parameters. The policy 310 can be set, for example, by an administrator of the network appliance 120, who can specify a condition and a decision whether to decrypt the data if the condition is satisfied. The policy application module 320 may use apply different policies to different data types, for example applying a first policy to a server certificate and a second policy to data extracted from a client connection request. After applying a policy, the policy application module 320 can return a decision to decrypt or not to decrypt to the networking module 305, which can initiate network connections and pass data over the connections based on the decision.

One example policy 310 causes the policy application module 320 to determine if data in a data stream has been signed by an upstream proxy (e.g., a device positioned between the network appliance 120 and the server 130). If the data is signed by the proxy, application of the example policy causes the policy application module 320 to decrypt the data before passing it to the client 110. If the data is not signed by the proxy, the policy application module 320 does not decrypt the data, passing encrypted data received at the network appliance 120 to the client 110. Another example policy 310 causes the policy application module 320 to determine if the server certificate is self-signed. Upon application of the policy, the policy application module 320 can determine not to decrypt if the certificate is self-signed.

Figure 4:
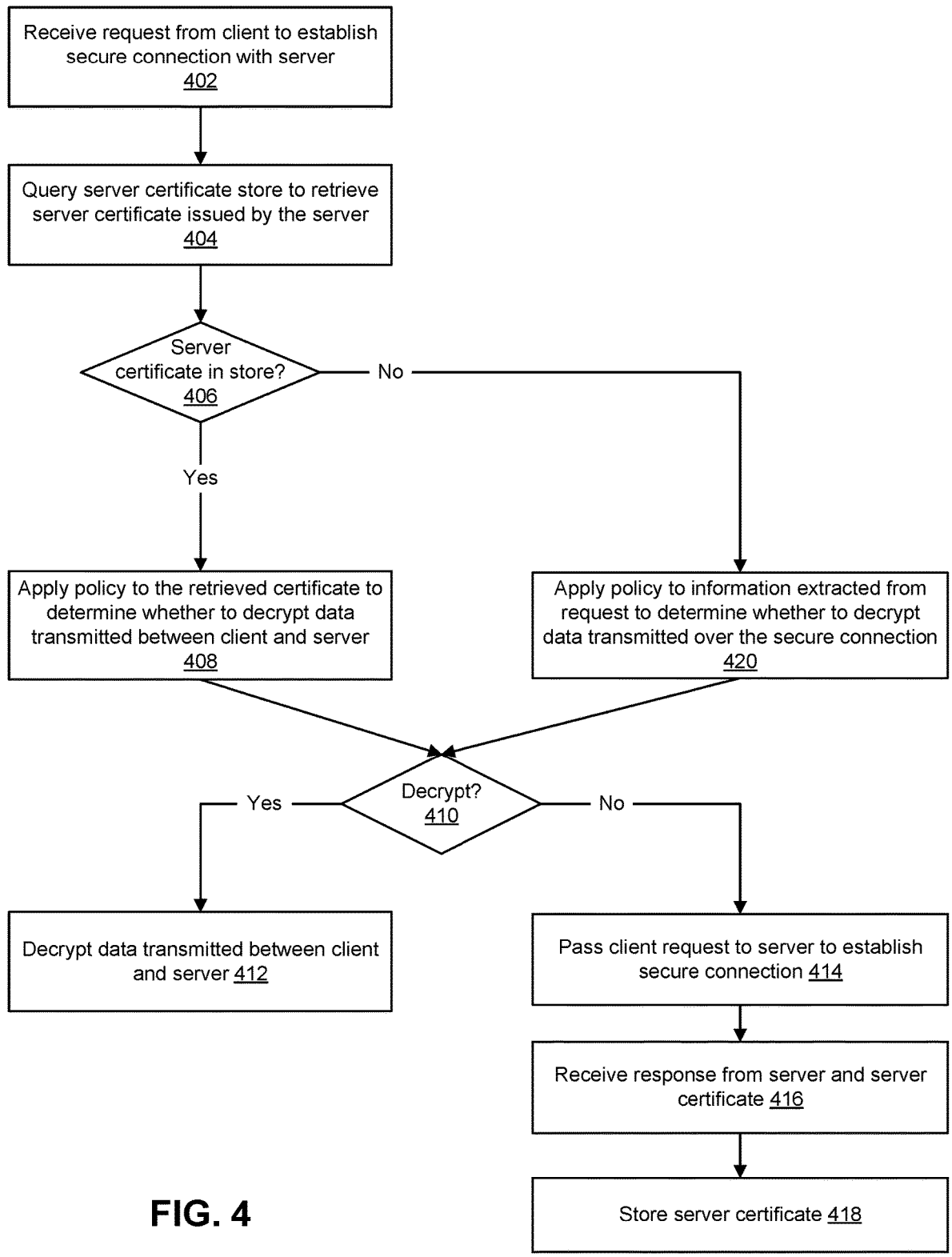
FIG. 4 is a flowchart illustrating a process for establishing communications by a network appliance.

FIG. 4 is a flowchart illustrating a process for establishing communications with a client 110 and a server 130. The process shown in FIG. 4 can be performed by the network appliance 120. Other embodiments can include additional, fewer, or different steps, and the steps can be performed in different orders. Furthermore, although references are made to specific communications protocols, other embodiments of the process can use different protocols for communication between the devices.

As shown in FIG. 4, the network appliance 120 receives 402 a request from the client device 110 to establish a secure network connection with the server 130. The request can be a request to securely connect to a server using a protocol such as TLS or SSL, and can identify the server by at least one of its SNI, socket address, or destination IP and destination port. The request can be transmitted, for example, as part of a transmission control protocol (TCP) three-way handshake initiated by the client 110 and intercepted by the network appliance 120.

In response to the client request, the network appliance 120 queries 404 the server certificate store 315 for a certificate issued by the server 130 identified in the request. The network appliance 120 can use any identifier of the server 130 to query the certificate store, such as the SNI or socket address of the server or the 3-tuple that identifies a source IP and the server IP address and port. In some embodiments, the network appliance 120 sequentially queries the certificate using these identifiers. For example, the network appliance 120 first extracts the SNI from the client request and queries the certificate store using the SNI. If the query does not return the server certificate, the network appliance 120 queries the certificate store using the socket address specified in the request. If neither query succeeds, the network appliance 120 can query the certificate store using the 3-tuple. Other embodiments of the network appliance 120 may perform a single lookup rather than submitting sequential queries, or may query the certificate store using fewer or additional server identifiers.

At step 406, the network appliance 120 determines whether the query (or any of the queries) returned the server certificate. If the certificate was present in the certificate store 315, the network appliance 120 can apply 408 a policy to the retrieved certificate to determine whether to decrypt data transmitted between the client 110 and server 130. If, at step 410, the network appliance 120 determines that data should be decrypted, the network appliance 120 decrypts 412 data transmitted between the client and server. Depending on the applied policy, the network appliance 120 may decrypt data transmitted by the server 130, data transmitted by the client 110, or both data streams.

If, at step 410, the network appliance 120 determines that data should not be decrypted based on the policy, the appliance 120 can pass 414 the client request to the server 130 to establish a secure network connection between the client 110 and server 130. For example, if the client request was a TLS "Hello" message requesting to establish a TLS connection with the server, the network appliance 120 can pass the message to the server 130 without modification. When the server 130 responds to the message, the network appliance 120 receives 416 the server response and the server's certificate. The network appliance 120 can store 418 the received certificate in the certificate store 315. In some cases, the appliance 120 may store 418 the certificate only if the received certificate is different from the certificate for the server that is currently stored at the network appliance 120, or if the stored certificate is older than a threshold age. In other cases, the appliance 120 may store 418 the server certificate each time it is received. The network appliance 120 may also apply the policy to the received server certificate to verify that the decision made to decrypt or not to decrypt is correct in view of the new certificate.

Returning to the decision at step 406 of FIG. 4, if the server certificate is not stored in the certificate store 315, the network appliance 120 can apply 420 a policy to information extracted from the client connection request to determine whether to decrypt data transmitted between the client 110 and server 130. The policy applied at step 420 can be different from the policy applied to the server certificate (e.g., at step 406), or the network appliance 120 can apply a different portion of the same policy. Based on the decision to decrypt or not to decrypt after applying the policy, the network appliance 120 can execute steps similar to those executed when the server certificate was found in the cache. However, since the policy was applied to the information extracted from the client request rather than the server certificate, the decision to decrypt or not to decrypt may be incorrect more often than when the policy is applied to a stored server certificate. Thus, it may be more likely for the network appliance 120 to tear down the network connection established in step 414 after applying the policy to information extracted from the client, while it is less likely that the connection will need to be torn down after applying the policy to the stored server certificate.

Example Network Appliance

Figure 5:
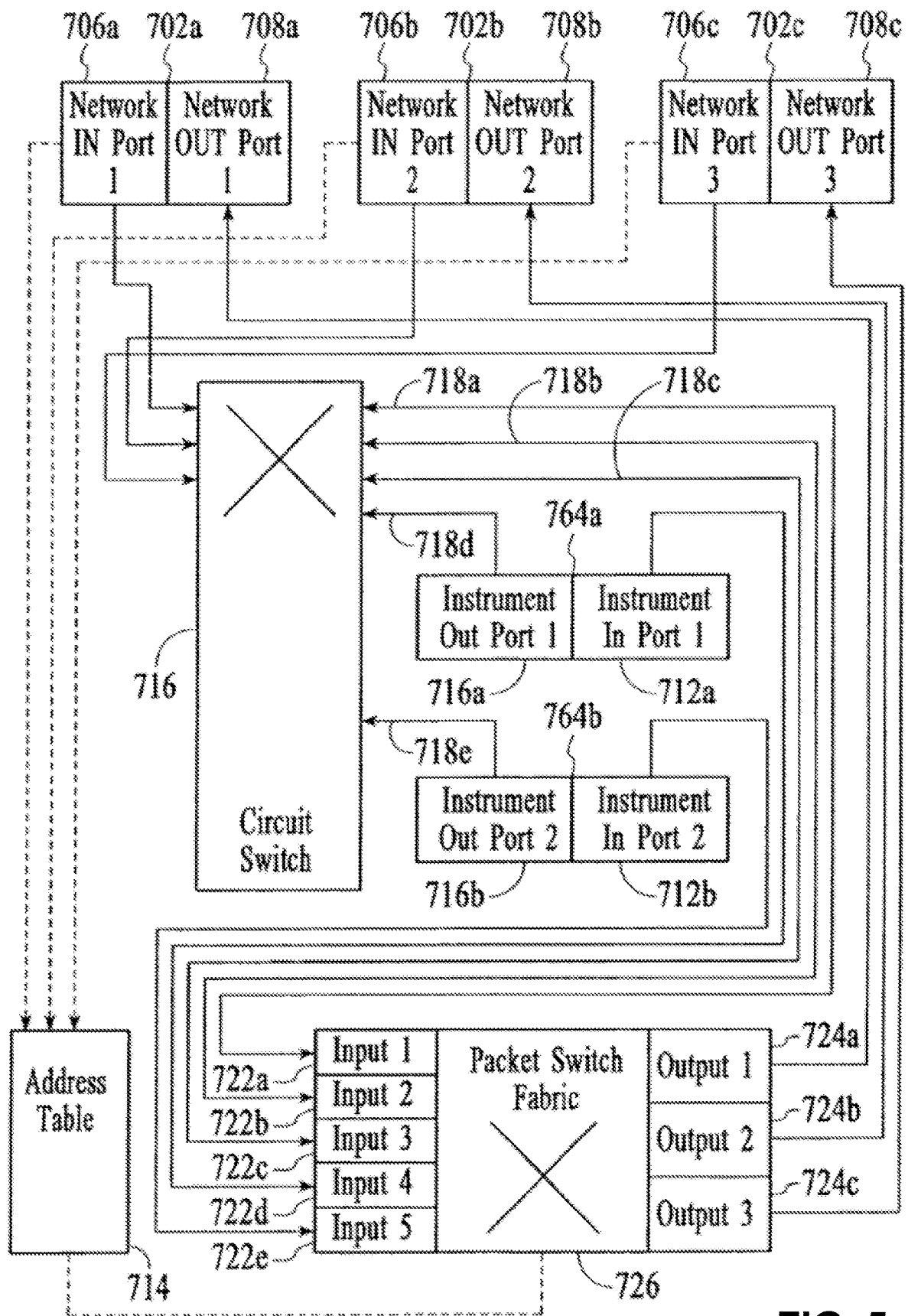
FIG. 5 is a simplified functional diagram of an example network appliance.

FIG. 5 is a simplified functional diagram of one example network appliance 120. The embodiment comprises three network ports 702 *a-c* and two instrument ports 704 *a-b*. Each network port 702 *a-c* comprises a network in port 706 *a-c* and a network out port 708 *a-c*. Each instrument port 704 *a-b* comprises an instrument in port 712 *a-b* and an instrument out port 710 *a-b*. Referring to FIG. 5, a first network port 702 *a* comprises a first network in port 706 *a* and a first network out port 708 *a*. A second network port 702 *b* comprises a second network in port 706 *b* and a second network out port 708 *b*, and a third network port 702 *c* comprises a third network in port 706 *c* and a third network out port 708 *c*. Further, a first instrument port 704 *a* comprises a first instrument in port 712 *a* and a first instrument out port 710 *a*, and a second instrument port 704 *b* comprises a second instrument in port 712 *b* and a second instrument out port 710 *b*. In operation, a network port is linked to and in communication with a set of terminals in the packet-switching network. The source addresses of the ingress packets originated from these terminals and received at the network in port of the network port are the terminal addresses of these terminals. The embodiment analyzes each ingress packet that the network in port of each network port receives. Further, the embodiment updates address Table 714 to include the source address of each ingress packet received at each network port and associate that network port with that source address, which is also the terminal address of a terminal that is linked to that network port. The terminal addresses associated with each network port are removed from address table 714 according to a predetermined strategy.

The ingress packets are directed from each network in port 706 *a-c* to the corresponding circuit switch inputs of circuit switch 716. In FIG. 5, the circuit switch inputs of circuit switch 716 are shown on the left side of the circuit switch block and the circuit switch outputs of circuit switch 716 are shown on the right side of the circuit switch block. Circuit switch 716 is an example implementation of a mux-switch. A mux-switch comprises a plurality of mux-switch inputs and a plurality of mux-switch outputs. The functions of the mux-switch include but are not limited to, aggregating the packet traffic from multiple mux-switch inputs to a mux-switch output, or directing the packet traffic from a mux-switch input to a mux-switch output, or broadcasting the packet traffic from a mux-switch input to multiple mux-switch outputs, or a combination thereof. The circuit switch input of circuit switch 716 is a mux-switch input. The circuit switch output of circuit switch 716 is a mux-switch output. The mux-switch may be manually controlled or program controlled so that, for example, the packet traffic pattern in the mux switch is reconfigurable.

Circuit switch 716 functions as a circuit cross connect switch, in which circuit switch 716 directs the packet traffic from a circuit switch input to a circuit switch output. Optionally, circuit switch 716 aggregates the packet traffic from multiple circuit switch inputs to a circuit switch output, or circuit switch 716 directs the packet traffic from a circuit switch input to one circuit switch output, or circuit switch 716 multicasts the packet traffic from a circuit switch input to multiple circuit switch outputs, or circuit switch 716 aggregates the packet traffic from multiple circuit switch inputs and multicasts the aggregated packet traffic to multiple circuit switch outputs, or a combination thereof. The circuit switch 716 shown in FIG. 4 comprises five circuit switch outputs 718 *a-e*. The packet traffic from at least one of the circuit switch outputs 718 *a-e* is directed to a first instrument out port 710 *a*. The packet traffic from the other circuit switch outputs 718 *a-e* may be directed to other instrument out ports, for example, a second instrument out port 710 *b*, or directed to the inputs 722 *a-e* of packet switch fabric 720. Direct packet traffic from circuit switch 716 to packet switch fabric 720 is optional, and the second instrument out port 710 *b* is optional. The packet traffic from instrument in ports, for example, first instrument in port 712 *a* and second instrument in port 712 *b*, are directed to the inputs of packet switch fabric 720. Second instrument in port 712 *b* is optional.

Packet switch fabric 720 examines the destination address of each packet it receives from its inputs 722 *a-e*; and looks up the identity of the network port that is associated with the destination address of the packet in address table 714. If the destination address of the packet is in address table 714, packet switch fabric 720 routes the packet to the network out port of the network port that is associated with the destination address in address table 714 through one of its outputs 724 *a-c*; otherwise, packet switch fabric 720 broadcasts the packet to the network out ports of a predetermined selection of network ports. This predetermined selection may include no network port, or at least one network port, or all network ports.

Figure 6:
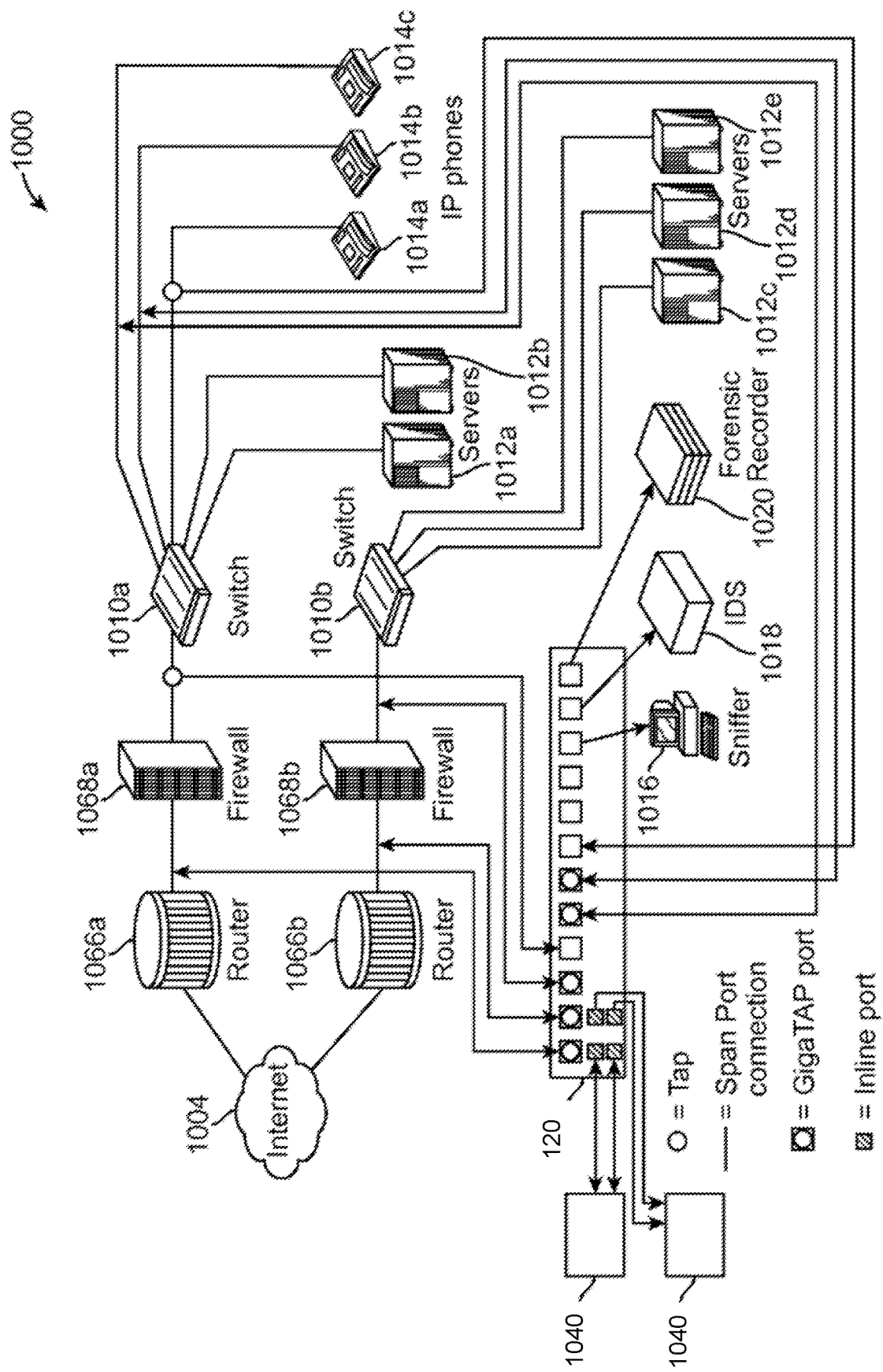
FIG. 6 shows an example deployment of the network appliance in a network environment

FIG. 6 shows an example deployment of the network appliance 120 in a network environment 1000 in accordance with some embodiments. The Internet 1004 is coupled via routers 1006 *a-b* and firewalls 1068 *a-b* to two switches 1010 *a* and 1010 *b*. Switch 1010 *a* is coupled to servers 1012 *a-b* and IP phones 1014*a-c*. Switch 1010 *b* is coupled to servers 1012*c-e*. A sniffer 1016, an IDS 1018 and a forensic recorder 1020 (collectively, "non-pass through instruments") are coupled to the device 300. As illustrated in FIG. 6, there is a reduction on the number of non-pass through instruments in this deployment as compared to a conventional configuration (in which there may be one or more non-pass through instruments between router 1066 *a* and firewall 1068 *a*, one or more non-pass through instruments between firewall 1068 *a* and switch 1010 *a*, one or more non-pass through instruments between router 1066 *b* and firewall 1068*b*, and firewall 1068 *b* and switch 1010 *b*) because the same non-pass through instruments can now access information anywhere in the network environment 1000 through the device 100. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014 *a-c* can be easily configured to be sent to an IDS 1018. It is also possible that traffic inside a particular IP phone 1014 *a-c* connection can be sent to a sniffer 1016, and Intrusion Detection System 1018 and a forensic recorder 1020 simultaneously via the one-to-many function. The packet processing features of the device 100 described herein allow the device 100 to process the packets based on a unified model to address any network monitoring requirements.

In some embodiments, when using the network appliance 120, one or more non-pass through instruments (such as IDS, sniffer, forensic recorder, etc.) may be connected to instrument port(s), and one or more pass through instruments 1040 (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the network appliance 120, the appliance 120 can compare whether the IDS or the IPS sees more threats, and/or can have a redundant protection such that if the IPS misses any threat, the IDS may pick it up.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method comprising:
receiving, at a network appliance from a client device, a communication that includes a request to establish a network connection to a server;
prior to initiating a network connection between the network appliance and the server:
accessing, by the network appliance, a server certificate issued by the server, wherein the accessing includes:
querying a server certificate cache at the network appliance using a server name indication (SNI) or a socket address extracted from the communication received from the client device, and
responsive to the querying of the server certificate cache using the extracted SNI or the extracted socket address not returning the server certificate, extracting a source internet protocol (IP) address, a destination IP address, and a destination port from the communication received from the client device and querying the server certificate cache using the extracted source IP address, destination IP address, and destination port;
responsive to a determination by the network appliance, based on application of a policy to the server certificate, not to decrypt data transmitted between the client device and the server, establishing, by the network appliance, only a single connection between the network appliance and the server; and
transmitting the data between the client device and the server over the single connection.

2. The method of claim 1, further comprising:
responsive to determining the server certificate is not stored in the server certificate cache, transmitting the communication from the client to the server;
receiving the server certificate from the server in response to transmitting the communication from the client to the server; and
storing the received server certificate in the server certificate cache.

3. The method of claim 2, further comprising:
after establishing the single connection between the network appliance and the server, receiving a new server certificate from the server; and
responsive to receiving the new server certificate, replacing the stored server certificate in the server certificate cache with the new server certificate.

4. The method of claim 1, further comprising:
responsive to determining, based on the application of the policy, to decrypt the data transmitted between the client device and the server, transmitting the communication from the client to the server.

5. The method of claim 1, wherein the server comprises a proxy device between the network appliance and one or more data sources that serve data requested by the client device, and wherein applying the policy comprises:
determining not to decrypt the data transmitted between the client device and the proxy device responsive to the server certificate not being signed by the proxy device; and
determining to decrypt the data transmitted between the client device and the proxy device responsive to the server certificate being signed by the proxy device.

6. The method of claim 1, wherein applying the policy comprises:
determining not to decrypt the data transmitted between the client device and the server responsive to the server certificate being self-signed by the server; and
determining to decrypt the data transmitted between the client device and the server responsive to the server certificate not being self-signed by the server.

7. A network appliance comprising:
a plurality of network ports;
a processor coupled to the plurality of network ports; and
a memory storing computer program instructions, execution of which by the processor causes the network appliance to:
receive, from a client device, a communication that includes a request to establish a network connection to a server;
prior to initiating a network connection between the network appliance and the server:
access a server certificate issued by the server, wherein the accessing includes:
querying a server certificate cache at the network appliance using an identifier extracted from the communication received from the client device, and
responsive to the querying of the server certificate cache using the extracted identifier not returning the server certificate, extracting an address from the communication received from the client device and querying the server certificate cache using the extracted address;
responsive to a determination, based on application of a policy to the server certificate, not to decrypt data transmitted between the client device and the server, establish only a single connection between the network appliance and the server; and
transmit the data between the client device and the server over the single connection.

8. The network appliance of claim 7, wherein the computer program instructions further cause the processor to:
responsive to determining the server certificate is not stored in the server certificate cache, transmit the communication from the client to the server;
receive the server certificate from the server in response to transmitting the communication from the client to the server; and
store the received server certificate in the server certificate cache.

9. The network appliance of claim 8, wherein the computer program instructions further cause the processor to:
after establishing the single connection between the network appliance and the server, receive a new server certificate from the server; and responsive to receiving the new server certificate, replace the stored server certificate in the server certificate cache with the new server certificate.

10. The network appliance of claim 7, wherein the computer program instructions further cause the processor to:
responsive to determining, based on the application of the policy, to decrypt the data transmitted between the client device and the server, transmitting the communication from the client to the server.

11. The network appliance of claim 7, wherein the server comprises a proxy device between the network appliance and one or more data sources that serve data requested by the client device, and wherein applying the policy comprises:
determine not to decrypt the data transmitted between the client device and the proxy device responsive to the server certificate not being signed by the proxy device; and
determine to decrypt the data transmitted between the client device and the proxy device responsive to the server certificate being signed by the proxy device.

12. The network appliance of claim 7, wherein applying the policy comprises:
determine not to decrypt the data transmitted between the client device and the server responsive to the server certificate being self-signed by the server; and
determine to decrypt the data transmitted between the client device and the server responsive to the server certificate not being self-signed by the server.

13. The network appliance of claim 7, further comprising a plurality of instrument ports each coupled to an instrument configured to monitor network traffic.

14. A non-transitory computer-readable storage medium storing computer program instructions, execution of which by a processor causes a processor to:
receive, at a network appliance from a client device, a communication that includes a request to establish a network connection to a server;
prior to initiating a network connection between the network appliance and the server:
access a server certificate issued by the server, wherein the accessing includes:
querying a server certificate cache at the network appliance using an identifier extracted from the communication received from the client device, and
responsive to the querying of the server certificate cache using the extracted identifier not returning the server certificate, extracting an address from the communication received from the client device and querying the server certificate cache using the extracted address;
responsive to a determination, based on application of a policy to the server certificate, not to decrypt data transmitted between the client device and the server, establish only a single connection between the network appliance and the server; and
transmit the data between the client device and the server over the single connection.

15. The non-transitory computer readable storage medium of claim 14, wherein the computer program instructions further cause the processor to:
responsive to determining the server certificate is not stored in the server certificate cache, transmit the communication from the client to the server;
receive the server certificate from the server in response to transmitting the communication from the client to the server; and
store the received server certificate in the server certificate cache.

16. The non-transitory computer readable storage medium of claim 14, wherein execution of the computer program instructions further causes the processor to:
after establishing the single connection between the network appliance and the server, receive a new server certificate from the server; and
responsive to receiving the new server certificate, replace the stored server certificate in the server certificate cache with the new server certificate.

17. The non-transitory computer readable storage medium of claim 14, wherein execution of the computer program instructions further causes the processor to:
responsive to determining, based on the application of the policy, to decrypt the data transmitted between the client device and the server, transmitting the communication from the client to the server.

18. The non-transitory computer readable storage medium of claim 14, wherein the server comprises a proxy device between the network appliance and one or more data sources that serve data requested by the client device, and wherein applying the policy comprises:
determine not to decrypt the data transmitted between the client device and the proxy device responsive to the server certificate not being signed by the proxy device; and
determine to decrypt the data transmitted between the client device and the proxy device responsive to the server certificate being signed by the proxy device.

19. The non-transitory computer readable storage medium of claim 14, wherein applying the policy comprises:
determine not to decrypt the data transmitted between the client device and the server responsive to the server certificate being self-signed by the server; and
determine to decrypt the data transmitted between the client device and the server responsive to the server certificate not being self-signed by the server.

20. The non-transitory computer readable storage medium of claim 14, wherein the address comprises one or more of a source internet protocol (IP) address, a destination IP address, or a socket address.

* * * * *